United States Patent [19]

Gagne et al.

[11] Patent Number: 5,671,636

[45] Date of Patent: Sep. 30, 1997

[54] METHOD AND APPARATUS FOR PREVENTING CIRCUMFERENTIAL SEPARATION BETWEEN TWO GEARS OF A GEAR TRAIN

[75] Inventors: Daniel Paul Gagne, S. Berwick, Me.; Bryan Charles Dustin, Rochester, N.H.

[73] Assignees: Heidelberg Harris Inc., Dover, N.H.; Heidelberger Druckmaschinen AG, Heidelberg, Germany

[21] Appl. No.: 590,893

[22] Filed: Jan. 24, 1996

[51] Int. Cl.$^6$ .................................................. F16H 57/12
[52] U.S. Cl. .............................. 74/409; 267/155; 464/57
[58] Field of Search ............................ 74/409; 267/155; 464/57

[56] References Cited

U.S. PATENT DOCUMENTS

| 976,232 | 11/1910 | Tyson | 464/57 |
|---|---|---|---|
| 1,950,448 | 3/1934 | Heisterkamp | 464/57 |
| 3,396,594 | 8/1968 | Walker | 74/409 |
| 4,671,129 | 6/1987 | Lovrenich | 74/409 X |
| 4,953,417 | 9/1990 | Baumgarten et al. | 74/409 |
| 5,357,858 | 10/1994 | Guaraldi et al. et al. | 74/409 |

*Primary Examiner*—Allan D. Herrmann
*Attorney, Agent, or Firm*—Burns, Doane, Swecker & Mathis, L.L.P.

[57] ABSTRACT

The present invention relates to an apparatus for preventing circumferential separation between the meshing teeth of a first gear and a second gear of a gear train. Exemplary embodiments of the invention include a first torque transmitting gear coaxially fixed to the first gear, a second torque transmitting gear in meshing engagement with the first torque transmitting gear, a third torque transmitting gear in meshing engagement with the second torque transmitting gear, and being rotatable about a shaft fixedly connected to a fourth torque transmitting gear which in turn is in meshing engagement with the second gear. The third torque transmitting gear is drivingly connected to the shaft via a preloaded resilient element formed by a first torsion spring and a second torsion spring. In an exemplary embodiment, the torsion springs are arranged such that windings of the first torsion spring are located within spaces formed between adjacent windings of the second torsion spring. The preloaded resilient element biases the third and fourth torque transmitting gears in opposite rotational directions about the shaft, thereby biasing the first gear and the second gear such that their teeth remain in contact.

17 Claims, 6 Drawing Sheets

METHOD AND APPARATUS FOR PREVENTING CIRCUMFERENTIAL SEPARATION BETWEEN TWO GEARS OF A GEAR TRAIN

BACKGROUND OF THE INVENTION

1. Field of the Invention

The present invention relates to a method and apparatus for preventing circumferential separation between the meshing teeth of a first gear and a second gear of a gear train. More specifically, the present invention relates to a method and apparatus for preventing circumferential separation of the meshing teeth of a driving gear connected to a blanket cylinder, and a driven gear connected to a plate cylinder in a printing press.

2. State of the Art

The gear teeth that mesh between a first gear and a corresponding second gear in a gear train (e.g., between a driving gear and a driven gear) tend to separate circumferentially when the gears rotate at very high speeds. Thus, in a printing press, the gear teeth on a driving gear which is fixed to a blanket cylinder of a rotary printing press tend to separate circumferentially from the gear teeth on a driven gear, which is fixed to an adjoining plate cylinder, when the cylinders rotate at very high speeds. The circumferential separation between the teeth of the gear connected to the blanket cylinder and the teeth of the gear connected to the plate cylinder of the printing press usually results in registering errors or in a so-called doubling of the printed dots, which severely affects the quality of the printed product, particularly in a lithographic printing press.

U.S. Pat. No. 5,357,858 discloses an apparatus for preventing circumferential separation of the meshing teeth of a blanket cylinder gear and a plate cylinder gear, which includes a first gear having gear teeth in meshing engagement with the gear teeth of the blanket cylinder gear. The first gear is rotatable about an axis. A second gear is coaxial with the first gear and is rotatable about the same axis relative to the first gear. A third gear has gear teeth in meshing engagement with the gear teeth on the second gear. A fourth gear is coaxial and rotatable with the plate cylinder gear, and has gear teeth in meshing engagement with the gear teeth on the third gear. The apparatus further includes resilient means in the form of a pre-loaded, commonly wound torsion spring, which drivingly connects the first gear and the second gear via a shaft fixedly connected to the first gear and extending through a hole in the center of the second gear along the axis of rotation of the first and second gears, thereby biasing the first and second gears about their common axis of rotation in respective directions that are opposite to each other. Since the torque, which is provided by the pre-loaded torsion spring to the shaft, results in a radial force acting on the shaft at the position where the end of the torsion spring is connected to the shaft, the supporting bearings of the shaft are highly loaded, and are therefore subject to an increased wear of the bearings and other components, which is likely to cause bearing failures.

SUMMARY OF THE INVENTION

Given the foregoing state of the art and its disadvantages, it is accordingly an object of the present invention to provide a method and apparatus for overcoming these disadvantages.

It is further an object of the present invention to eliminate the radial forces on the supporting bearings which are caused by pre-loaded resilient means.

According to a first object of the invention, a method and apparatus are provided for preventing the circumferential separation between the meshing teeth of a first gear and a second gear of a gear train. Exemplary embodiments comprise a first torque transmitting gear coaxial and drivingly connected with a first gear, a second torque transmitting gear in meshing engagement with the first torque transmitting gear, a third torque transmitting gear in meshing engagement with the second torque transmitting gear, a fourth torque transmitting gear coaxial to the third torque transmitting gear and in meshing engagement with a second gear, a shaft which is fixedly connected at a first end to the fourth torque transmitting gear and which axially extends through a center of the third torque transmitting gear, and a pre-loaded resilient element for biasing the third and fourth torque transmitting gears with respective torques of equal magnitude and opposite direction, the resilient element including a first torsion spring and a second torsion spring, each having a first end portion drivingly connected to the third torque transmitting gear and each having a second end portion connected to a second end of the shaft, such that the second end portions of the first and second torsion springs are connected to the second end of the shaft at essentially diametrical positions with respect to a center of the shaft.

According to a further object of the invention, the first end portions of the first and second torsion springs are connected to the third torque transmitting gear at essentially diametrical positions with respect to the center of the third torque transmitting gear.

Pursuant to another object of the invention, the winding of the first torsion spring and the winding of the second torsion spring are arranged such that the winding of the first torsion spring is located within spaces formed between adjacent windings of the second torsion spring.

Exemplary embodiments in accordance with the present invention further comprise a first collar fixedly mounted to the third torque transmitting gear to which the respective first end portions of the first and second torsion springs are drivingly connected at essentially diametrical positions.

In further exemplary embodiments of the invention, the first end portion of each of the first and second torsion springs comprises a first section extending essentially towards the center of the torsion spring, the first sections of the first and second torsion springs being received in a first recess and in a second recess, respectively formed in the first collar.

According to further exemplary embodiments of the invention, a second collar is provided which is clamped to the second end of the shaft to which the second end portions of the first and second torsion springs are connected at essentially diametrical positions.

In accordance with alternate exemplary embodiments of the invention, the second end portions of the first and second torsion springs each comprise a second section which is essentially parallel to the shaft and which extends into a hole formed in the second collar.

BRIEF DESCRIPTION OF THE DRAWINGS

The foregoing and other features of the present invention will become apparent to those skilled in the art to which the present invention relates from reading the following description with reference to the accompanying drawings, in which.

DETAILED DESCRIPTION OF THE PREFERRED EMBODIMENTS

Figure 1:
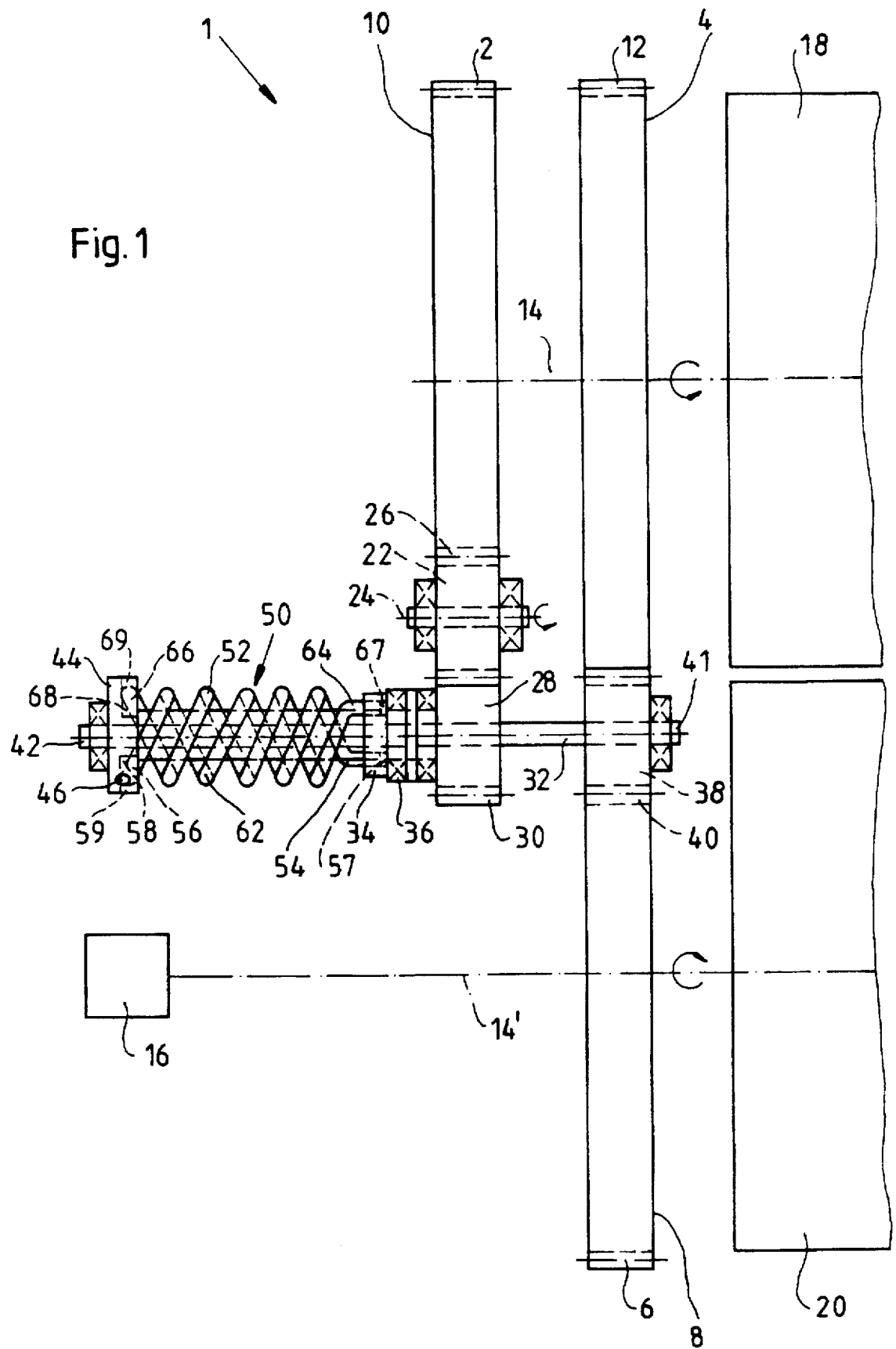
FIG. 1 is an exploded schematic sectional view of an exemplary embodiment of the invention installed in a printing press.
Figure 2:
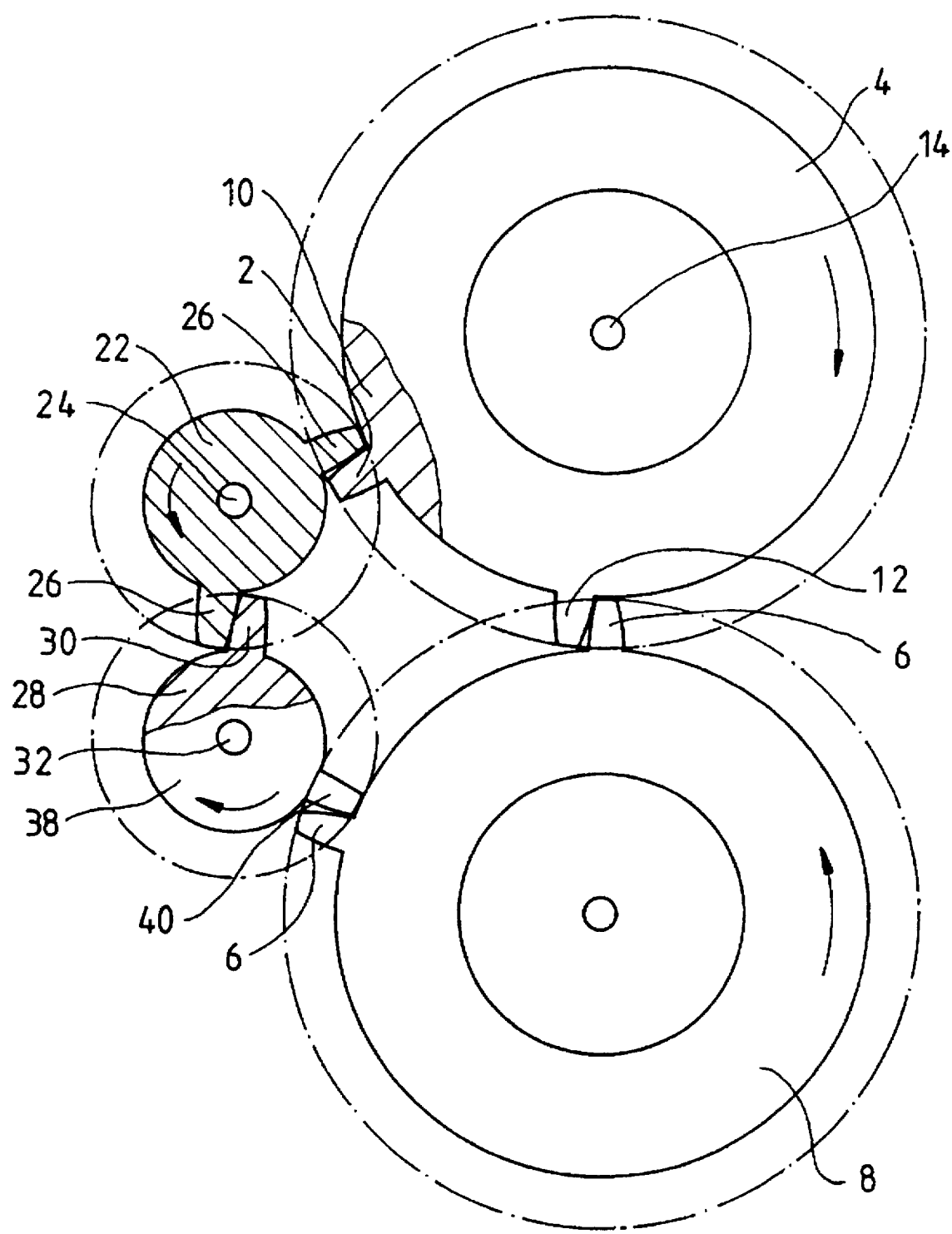
FIG. 2 shows a schematic side view of the exemplary apparatus of FIG. 1.

As shown in FIG. 1 and FIG. 2, an exemplary apparatus 1 for preventing the circumferential separation between the teeth 12 of a first gear 4 meshing with the teeth 6 of a second gear 8 comprises a first torque transmitting gear 10 having teeth 2 and being mounted coaxially to the first gear 4 on a common shaft 14 which can be a driving shaft driven by a motor 16, as shown in FIG. 1. The first gear 4 and the second gear 8 can be gears of a gear train with two or more meshing gears which are used in a lithographic printing press for driving the cylinders of the press.

As shown in FIG. 1, the first gear 4 can be the driving gear of a plate cylinder 18 and the second gear 8 can be the driving gear of an adjoining blanket cylinder 20 of the press, which is driven by the motor 16 via the driving shaft 14'. The apparatus 1 further comprises a second torque transmitting gear 22 which is freely rotatable about an axis of rotation 24 and which has teeth 26 which are in meshing engagement with the teeth 2 of the first torque transmitting gear 10. The apparatus further comprises a third torque transmitting gear 28 having teeth 30 which are in meshing engagement with the teeth 26 of the second torque transmitting gear 22. The third torque transmitting gear 28 is rotatable about a shaft 32 which extends through the center of the third torque transmitting gear 28, as shown in FIG. 1.

Figure 3:
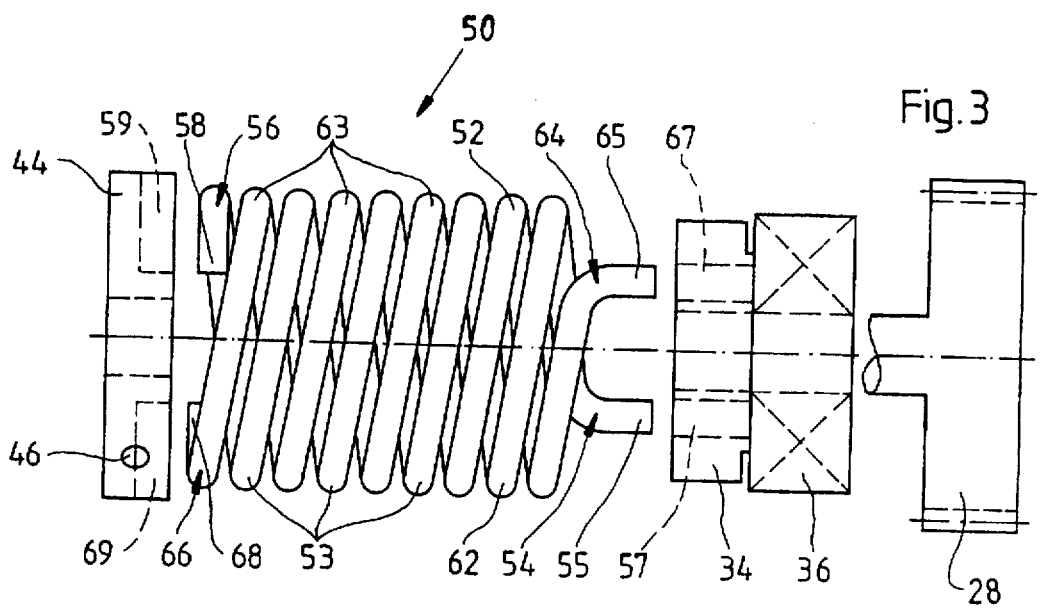
FIG. 3 is a schematic side view of an exemplary embodiment of a resilient element used in the apparatus of FIG. 1.

In an exemplary embodiment of the invention, the third torque transmitting gear 28 is drivingly connected to a first collar 34 as shown in FIGS. 1 and 3, or the first collar 34 can be formed at the third torque transmitting gear 28. In an exemplary embodiment of the invention, a bearing 36 is provided between the first collar 34 and the third torque transmitting gear 28 for rotatably supporting the third torque transmitting gear 28.

The apparatus 1 further comprises a fourth torque transmitting gear 38 having teeth 40 which are in meshing engagement with the teeth 6 of the second gear 8. The fourth torque transmitting gear 38 is fixedly mounted on the first end 41 of the shaft 32. As shown in FIG. 1, a second collar 44 is fixedly mounted to the second end 42 of the shaft 32. In an exemplary embodiment of the invention, the second collar 44 is clamped to the second end 42 of the shaft 32 by means of a screw 46, such that it is angularly adjustable on the shaft 32.

The apparatus described above represents a general embodiment of the apparatus described in detail in U.S. Pat. No. 5,357,858. The description of embodiments in U.S. Pat. No. 5,357,858 is hereby incorporated by reference in its entirety, and any combination of the features described in U.S. Pat. No. 5,357,858 with the features described hereinbelow are considered to be encompassed by the present invention.

The apparatus of U.S. Pat. No. 5,357,858 is shown schematically in FIG. 6, wherein similar reference numerals have been used by identify like elements relative to FIG. 1, with the difference being that reference numerals of FIG. 6 have been increased by 100 relative to like elements of FIG. 1.

Figure 4:
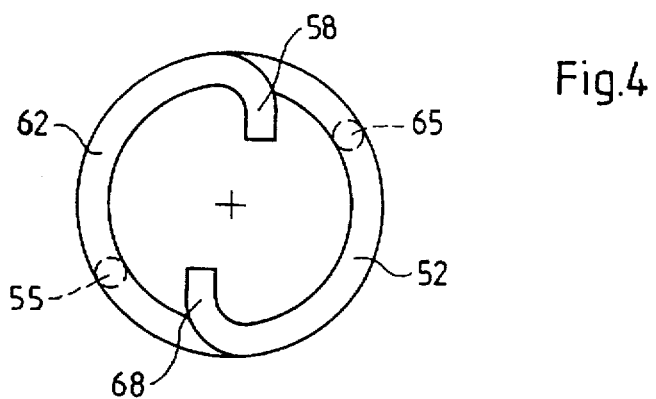
FIG. 4 shows a schematic front view of the exemplary resilient element of FIG. 3.

As shown in FIG. 1 and FIG. 3, the first collar 34 and the second collar 44 are drivingly connected by a resilient element 50 which is shown in detail in FIG. 3 and FIG. 4. In an exemplary embodiment, the resilient element 50 includes a first torsion spring 52 which is fixed to the first collar 34 with its first end portion 54, and which is fixed to the second collar 44 with its second end portion 56. The resilient element 50 further includes a second torsion spring 62 which is fixed to the first collar 34 with its first end portion 64 and which is fixed to the second collar 44 with its second end portion 66.

In an exemplary embodiment of the invention, the windings 53 (FIG. 3) of the first torsion spring 52 and the windings 63 of the second torsion spring 62 are arranged such that the windings 53 of the first torsion spring 52 are located within spaces formed between adjacent windings 63 of the second torsion spring 62. Therefore, the first torsion spring 52 and the second torsion spring 62 can be identical torsion springs which are, for example, manufactured separately and which are afterwards assembled by axially winding one spring into the other spring.

According to a further embodiment of the invention, the first end portions 54, 64 of the first and second torsion springs 52, 62 comprise respective first sections 55, 65 which are essentially parallel to the longitudinal axes of the springs 52, 62 and/or the shaft 32, as shown in FIG. 3. The first essentially parallel sections 55 and 65 of the springs 52, 62 are, in an exemplary embodiment, received by respective holes 57 and 67 formed in the first collar 34.

The second end portion 56 of the first torsion spring 52 and the second end portion 66 of the second torsion spring 62 can further comprise respective second sections 58 and 68 which extend inwardly. For example, the second sections 58 and 68 can extend into a direction essentially towards the center of the springs 52, 62, as shown in FIG. 4. In this embodiment, an essentially radial recess 59, 69 (FIG. 3) can be formed in the second collar 44 which receives the respective second sections 58, 68 of the first and second torsion springs 52, 62.

Those skilled in the art will appreciate that the first sections 55, 65 of the first and second torsion springs 52, 62 can be formed in the same way as the second sections 58, 68 of the respective second end portions 56, 66 described above. In such an embodiment, those skilled in the art will appreciate that respective recesses similar to the recesses 59 and 69 can be provided in the first collar 34 for receiving the so formed first sections 55, 65.

Alternately, the second sections 58, 68 can be formed in the same way as the first sections 55, 65 described above, whereby the second collar 44 can be formed similar to the first collar 34 shown in FIG. 3 and described above, having respective holes similar to the holes 57 and 67 for receiving the so formed second sections 58, 68.

In an exemplary embodiment of the invention, the first sections 55 and 65 are arranged at essentially diametrical positions with respect to the longitudinal axis of the shaft 32, as shown in FIG. 4. Similarly, the second sections 58, 68 are arranged at essentially diametrical positions with respect to the longitudinal axis of the shaft 32.

Figure 5:
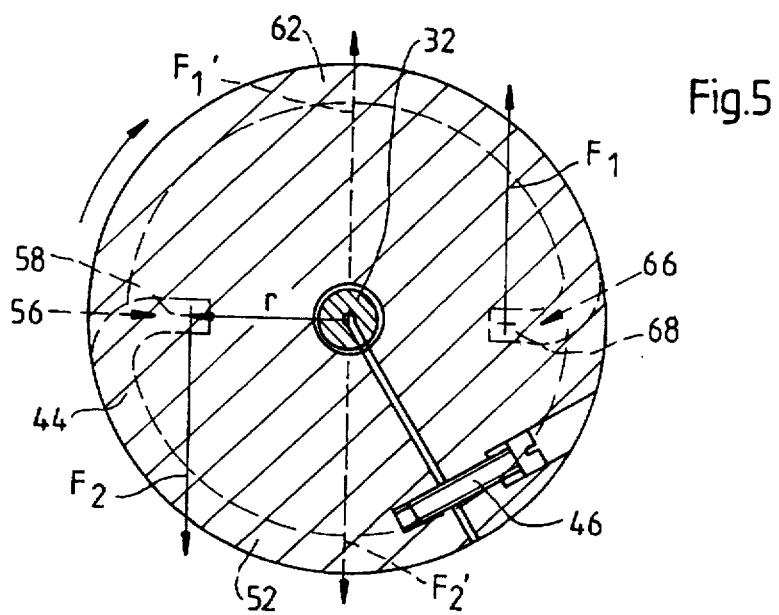
FIG. 5 shows a schematic diagram of forces applied to a second collar by an exemplary resilient element.

As shown in FIG. 5, the forces $F_1$ and $F_2$ which are applied to the second collar 44 by the second sections 58 and 68 of the respective first and second torsion springs 52, 62 cancel each other out or offset each other, so that the resulting force $F_1'+F_2'$ applied to the center of the collar 44, and thereby to the shaft 32, is zero. The forces $F_1'$ and $F_2'$ of FIG. 5 are the projections of the forces $F_1$ and $F_2$ to the center of the shaft 32 or the second collar 44, and result from the torque applied to the second collar 44 by the respective pre-loaded first and second torsion springs 52 and 62 at the distance "r" from the center of the collar 44.

Figure 6:
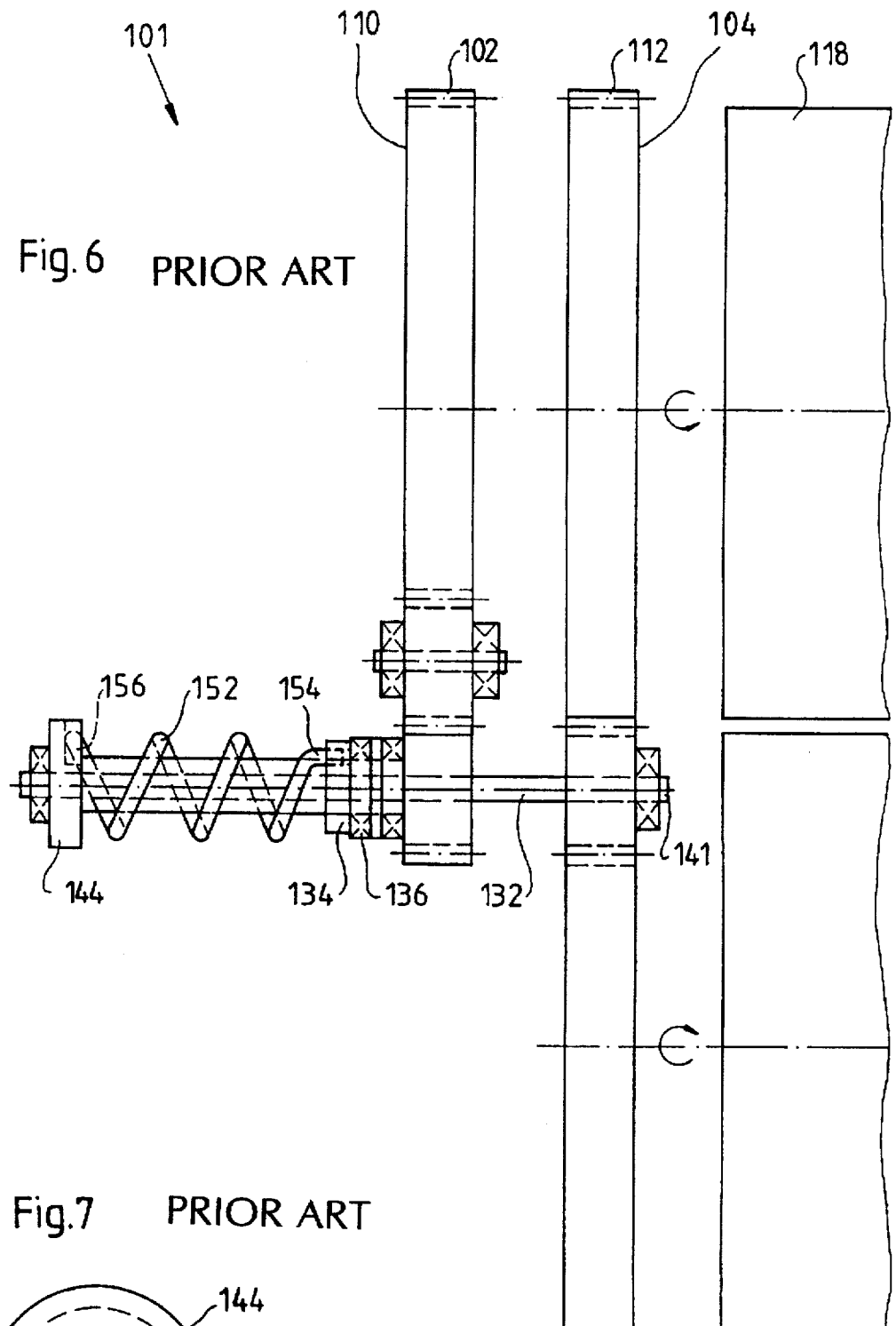
FIG. 6 shows an exploded schematic view of an exemplary, conventional apparatus for preventing circumferential separation between a driving gear and a driven gear.
Figure 7:
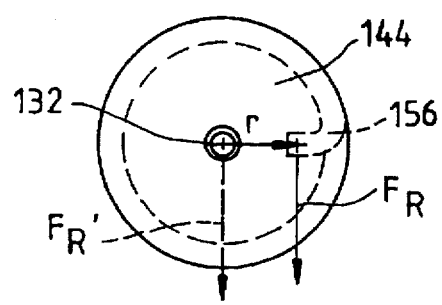
FIG. 7 shows a schematic diagram of the forces applied to the second collar by the conventional resilient element of the apparatus shown in FIG. 6.

As can be seen from FIG. 7, the resulting force $F_R'$ acting on the center of the collar 144 of a conventional apparatus 101 of FIG. 6, and being caused by the force $F_R$ applied to the collar 144 at a distance "r" from the center of the collar 144 by the second end portion 156 of the single torsion spring 152, does not equal zero. Accordingly, a permanent load is applied to the shaft 132 of the conventional apparatus 101 of FIG. 6, thereby resulting in an increased wear of the bearings, such as the bearings 136 rotatably supporting the shaft 132. Since the resulting force $F_1'+F_2'$ acting on the center of the second collar 44 of the exemplary apparatus 1 according to the invention equals zero due to the existence of opposite and equal forces $F_1'$ and $F_2'$, there is no such wear of bearings, such as the bearing 36 for rotatably supporting the shaft 32 of the FIG. 1 apparatus.

By pre-loading the resilient element 50, the third torque transmitting gear 28 and the fourth torque transmitting gear 38 are biased in opposite rotational directions. Further, as a result of the meshing engagement of the second torque transmitting gear 22 with the first torque transmitting gear 10, and the meshing engagement between the fourth torque transmitting gear 38 and the second gear 8, the second gear 8 and the first gear 4 are also biased such that the teeth 12 of the first gear 4 and the teeth 6 of the second gear 8 are in permanent contact with each other, as shown in FIG. 2.

Figure 8:
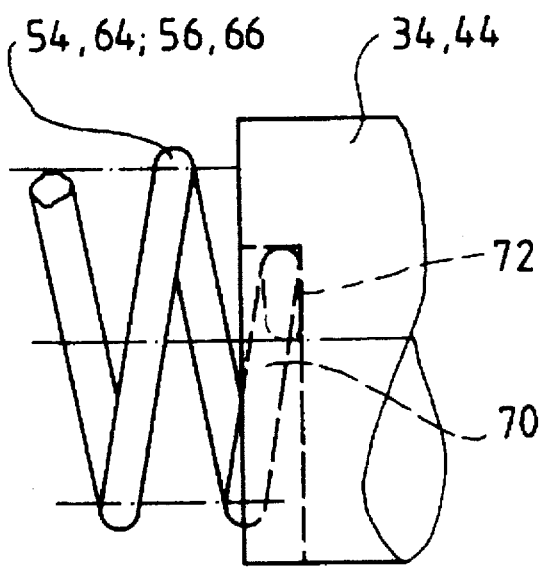
FIG. 8 shows a schematic view of an exemplary embodiment of a torsion spring in accordance with the present invention having a straight end section received in a respective recess formed in a collar.

It will be apparent to those skilled in the art that there are further alternate embodiments for forming the first end portions 54, 64 and the second end portions 56, 66. For example, as shown in FIG. 8, any one or all of the first and second end portions 54, 64 and 56, 66 can be formed with a straight end section 70, which is received in a recess 72 formed in the first and/or second collar 34, 44, respectively, and which can be combined with any of the first sections 55, 65 which are essentially parallel to the longitudinal axis of the springs 52, 62 or which can be combined with the second sections 58, 68, extending in a direction essentially towards the center of the respective springs 52, 62. Thus, it is evident that each of the end portions 54, 64, 56, 66 of the first and/or second torsion springs 52, 62 can have sections which are either essentially parallel to the longitudinal axis of the springs, which can extend inwardly essentially towards the center of the spring, or which can be formed as a straight section 70 as shown in FIG. 8. Furthermore, each of the torsion springs 52, 62 can be provided with two different kinds of the aforementioned end sections at its respective end portions.

For pre-loading the resilient element 50 formed by the first and second torsion springs 52 and 62, the second collar 44 shown in FIG. 5 can be turned in a clockwise direction before it is clamped to the shaft 32 by tightening the screw 46. Alternately, or in addition, the resilient element 50 can be pre-loaded by turning the second collar 44 in anti-clockwise direction.

In printing units comprising a first upper plate cylinder and an adjoining first upper blanket cylinder for printing on the upper side of a web, and also comprising a second lower plate cylinder and an adjoining second lower blanket cylinder for printing on the lower side of the web at the same time, it is advantageous to use a first apparatus 1 for the upper cylinders and a second apparatus 1 for the lower cylinders, respectively. In this case, the coil directions or the winding directions of the torsion springs used in the first apparatus 1 for the upper cylinders can, in an exemplary embodiment, be different from the winding direction of the torsion springs used in the second apparatus 1 for the lower cylinders. Further, the torsion springs of the first apparatus 1 used for the upper cylinders can be preloaded in a direction opposite to the preload direction of the springs used in the apparatus of the lower cylinders.

Figure 9:
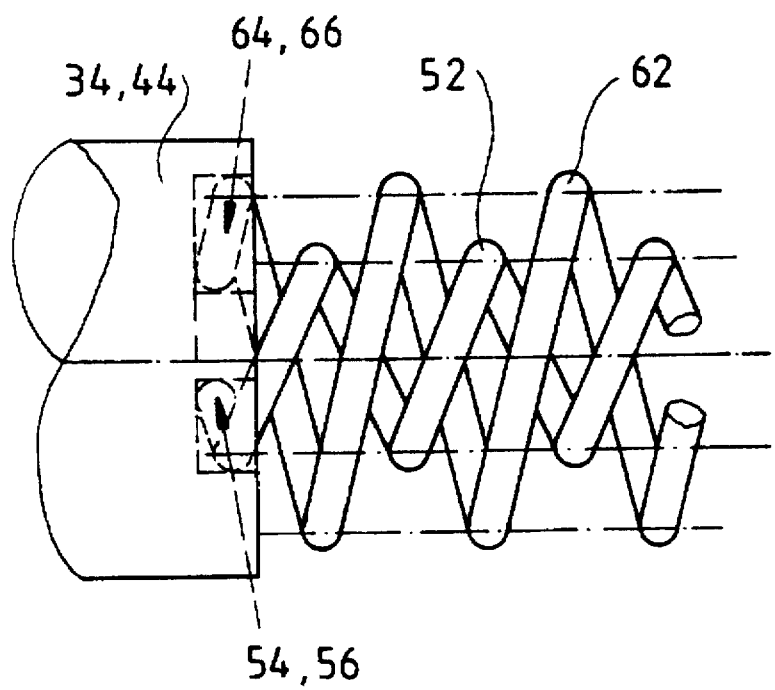
FIG. 9 shows a first torsion spring and a second torsion spring mounted to a collar according to an exemplary embodiment of the present invention, the torsion springs being configured such that the first spring is arranged inside the windings of the second spring.

In a further exemplary embodiment of the invention which is shown in FIG. 9, the first and the second torsion springs 52, 62 can be configured such that the outside diameter of the first torsion spring 52 is smaller than the inside diameter of the second torsion spring 62. In this embodiment, the pair of springs 52, 62 is assembled one inside the other. Further, in this embodiment, the inner spring 52 and/or outer spring 62 can be configured or selected with a stiffness such that the same load is applied at an essentially diametrical position with respect to the longitudinal axis of the shaft 32 to the second collar 44 and/or the first collar 34, as the outer torsion spring 62, so that the resulting force $F_1'+F_2'$ acting on the shaft 32 is zero.

In an exemplary embodiment of the invention, the stiffness (that is, the spring constant) of the torsion springs is selected (e.g., set equal), so that essentially equal magnitude forces of opposite direction are applied to the first and/or second collars 34, 44, which cancel each other out, so that there is no load applied to the first and/or second collars 34, 44. In the FIG. 9 embodiment, since the distances from the centers of the collars 34, 44 to the positions where the end portions 54, 64, 56, 66 are affixed to the collars 34, 44 can be different for the inner spring 52 and for the outer spring 62, the torque provided by the inner spring 52 can be different from the torque provided by the outer spring 62. Accordingly, the stiffness of the springs 52 and 62 can be selected so that essentially equal forces of opposite direction are applied to the first and/or second collars.

Figure 10:
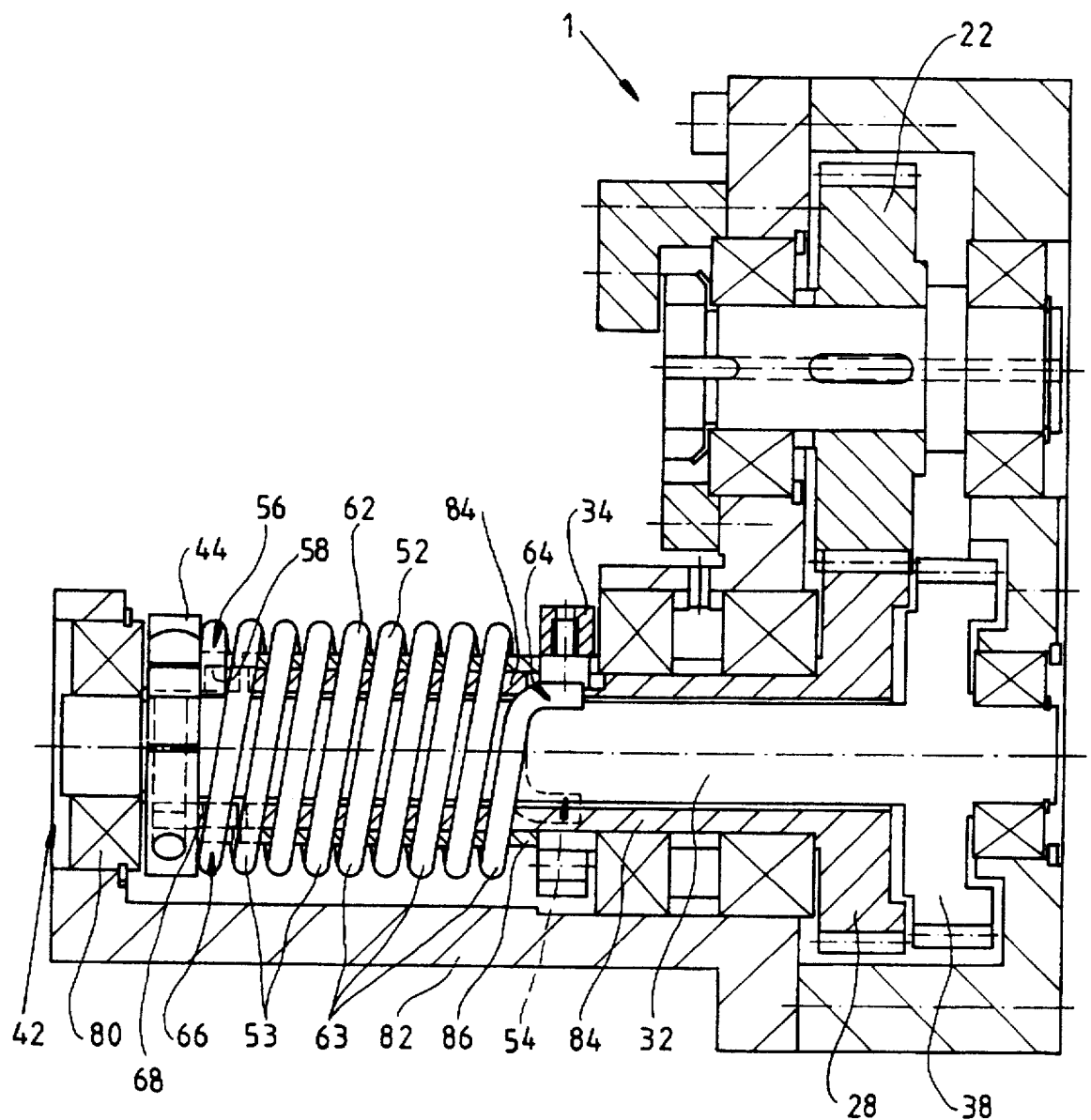
FIG. 10 shows a further exemplary embodiment of the present invention in which a shaft is rotatably supported by a bearing mounted on its second end, and a further sleeve-shaped shaft rotatable about the first shaft is formed at the first collar of an exemplary apparatus according to the present invention.

Further, as shown in FIG. 10, a sleeve-shaped shaft 84 can be formed at the first collar 34 for supporting the first and second torsion springs 52, 62, and can extend inside the springs 52, 62 from the first collar 34 to the second collar 44 without being connected to the second collar 44. As shown in FIG. 10, there can further be provided a spacer 86 around the shaft 84, whereby the outer diameter of the spacer 86 is slightly smaller than the inner diameter of the windings 53 of the first torsion spring 52 and the windings 63 of the second torsion spring 62 so that the shaft 84 is rotatable within the first and second torsion springs 52, 62, thereby protecting the circumferential surface of the shaft 32 against fretting by the windings 53, 63 of the first and second torsion springs.

In an exemplary embodiment of the invention, all of the afore-described variations of torsion springs 52, 62 with the various kinds of end portions having either straight sections, sections extending essentially towards the center of the spring or sections which are essentially parallel to the axis of the shaft 32, can be used. As described with respect to the embodiment shown in FIG. 1, since the forces applied to the second collar 44 by the respective second end portions 56, 66 of the torsion springs 52, 62 cancel each other out, there is no load applied to the second end 42 of the shaft 32. Therefore, there is no load applied to the sleeve-shaped shaft 84 rotatably supported on the shaft 32 of the FIG. 10 embodiment which could cause wear of the circumferential surface of the shaft 32 and the inner surface of the sleeve-shaped shaft 84.

In a further embodiment of the invention, shown in FIG. 10, the second end 42 of the shaft 32 can be supported by a bearing 80 mounted to a support 82. The support 82 can, for example, be formed at the housing of a gear train or the housing of a printing press. In this embodiment of the invention, the shaft 32 and the sleeve-shaped shaft 84 are each rotatably supported in their own separate bearings. Thus, there is no contact between the two shafts, due to a remaining load to the shaft 32 or a second collar 44 which could, for example, be generated if the end portions 56, 66 of the springs 52, 62 were not connected to the second collar 44 diametrically.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for preventing the circumferential separation between meshing teeth of a first gear and a second gear of a gear train, comprising:

a first torque transmitting gear coaxial to and drivingly connected with a first gear;

a second torque transmitting gear in meshing engagement with the first torque transmitting gear;

a third torque transmitting gear in meshing engagement with said second torque transmitting gear;

a fourth torque transmitting gear coaxial to said third torque transmitting gear and in meshing engagement with a second gear;

a shaft which is fixedly connected at a first end to the fourth torque transmitting gear and which axially extends through a center of said third torque transmitting gear; and a pre-loaded resilient element for biasing said third and fourth torque transmitting gears with respective torques of equal magnitude and opposite direction, the resilient element including a first torsion spring and a second torsion spring, each having a first end portion drivingly connected to the third torque transmitting gear and each having second end portion connected to a second end of the shaft, such that the second end portions of the first and second torsion springs are connected to the second end of the shaft at essentially diametrical positions with respect to a center of the shaft.

2. Apparatus according to claim 1, wherein the first end portions of the first and second torsion springs are connected to the third torque transmitting gear at essentially diametrical positions with respect to the center of the third torque transmitting gear.

3. Apparatus according to claim 1, wherein windings of the first torsion spring and windings of the second torsion spring are arranged such that windings of the first torsion spring are located within spaces formed between adjacent windings of the second torsion spring.

4. Apparatus according to claim 1, wherein a winding of the first torsion spring has a smaller outer diameter than an inner diameter of a winding of the second torsion spring, the winding of the first torsion spring being located within the winding of the second torsion spring.

5. Apparatus according to claim 4, wherein a stiffness of the first torsion spring is equal to a stiffness of the second torsion spring.

6. Apparatus according to claim 2, further comprising:

a first collar to which the first end portions of the first and second torsion springs are drivingly connected at essentially diametrical positions, said first collar being fixedly mounted to the third torque transmitting gear.

7. Apparatus according to claim 6, further comprising:

a sleeve-shaped shaft for supporting the first and second torsion springs at the first collar, said sleeve-shaped shaft extending from said first collar towards the second end of the shaft.

8. Apparatus according to claim 7, wherein the sleeve-shaped shaft and the shaft are rotatably supported separately from each other.

9. Apparatus according to claim 7, wherein the sleeve-shaped shaft extends essentially over an entire length of the first and second torsion springs.

10. Apparatus according to claim 1, further comprising:

a second collar which is clamped to the second end of the shaft and to which the second end portions of the first and second torsion springs are connected at essentially diametrical positions.

11. Apparatus according to claim 6, further comprising:

a second collar which is clamped to the second end of the shaft and to which the second end portions of the first and second torsion springs are connected at essentially diametrical positions.

12. Apparatus according to claim 1, wherein at least one of said first and said second end portions of at least one of the first and second torsion springs comprises:

a first section extending essentially towards a center of the first and second torsion springs.

13. Apparatus according to claim 1, wherein at least one of said first and second end portions of at least one of the first and second torsion springs comprises:

a second section which is essentially parallel to said shaft.

14. Apparatus according to claim 12, wherein at least one of said first and second end portions of at least one of the first and second torsion springs comprises:

a second section which is essentially parallel to said shaft.

15. Apparatus according to claim 1, wherein at least one of said first and said second end portions of at least one of the first and second torsion springs comprises:

a straight end section.

16. Apparatus according to claim 12, wherein at least one of said first and second end portions of at least one of the first and second torsion springs comprises:

a straight end section.

17. Apparatus according to claim 14, wherein at least one of said first and second end portions of at least one of the first and second torsion springs comprises: a straight end section.

* * * * *